US011626621B2

(12) United States Patent
Djenizian et al.

(10) Patent No.: US 11,626,621 B2
(45) Date of Patent: Apr. 11, 2023

(54) DEFORMABLE ACCUMULATOR

(71) Applicant: INSTITUT MINES TELECOM, Paris (FR)

(72) Inventors: Thierry Djenizian, Auriol (FR); Roger Delattre, Marseilles (FR)

(73) Assignee: INSTITUT MINES TELECOM, Paris (FR)

( * ) Notice: Subject to any disclaimer, the term of this patent is extended or adjusted under 35 U.S.C. 154(b) by 559 days.

(21) Appl. No.: 16/494,205

(22) PCT Filed: Feb. 19, 2018

(86) PCT No.: PCT/FR2018/050385
§ 371 (c)(1),
(2) Date: Sep. 13, 2019

(87) PCT Pub. No.: WO2018/167393
PCT Pub. Date: Sep. 20, 2018

(65) Prior Publication Data
US 2020/0052340 A1 Feb. 13, 2020

(30) Foreign Application Priority Data
Mar. 15, 2017 (FR) ..................... 17/52113

(51) Int. Cl.
*H01M 10/0585* (2010.01)
*H01M 4/139* (2010.01)
(Continued)

(52) U.S. Cl.
CPC ....... *H01M 10/0585* (2013.01); *H01M 4/139* (2013.01); *H01M 4/70* (2013.01);
(Continued)

(58) Field of Classification Search
CPC .... H01M 10/0585; H01M 4/139; H01M 4/70; H01M 10/0525; H01M 10/054; H01M 2300/0082
See application file for complete search history.

(56) References Cited

U.S. PATENT DOCUMENTS 9,196,897 B2   11/2015  Asai et al.
9,496,582 B1 * 11/2016  Lim ........................ H01M 4/70
(Continued)

FOREIGN PATENT DOCUMENTS

CN      103155230 A    6/2013
CN      103904357 A    7/2014
(Continued)

OTHER PUBLICATIONS

Xu, S., Zhang, Y., Cho, J. et al. Stretchable batteries with self-similar serpentine interconnects and integrated wireless recharging systems. (2013) NatCommun 4, 1543. https://doi.org/10.1038/ncomms2553 (Year: 2013).*
(Continued)

*Primary Examiner* — Brian R Ohara
*Assistant Examiner* — Emily Elizabeth Freeman
(74) *Attorney, Agent, or Firm* — BakerHostetler

(57) ABSTRACT

The invention relates to a deformable accumulator comprising: a. a first and a second substrate (1,1'), b. at least one first current collector (2a, 2b, . . . ) deposited on the first substrate, along a curved line, c. at least one second current collector (2a', 2b', . . . ) deposited on the second substrate, along a second curved line, d. an anode consisting of a first set of columns (4) deposited on the first current collector (2a', 2b', . . . ), e. a cathode consisting of a second set of columns (4') deposited on the second current collector (2a', 2b', . . . ), f. an electrolyte allowing the transfer of the ionic species, the faces of the first and the second substrate facing
(Continued)

each other and defining a space (5) occupied by the electrolyte in which the columns of the anode (4) and the cathode (4') are submerged.

3 Claims, 5 Drawing Sheets

(51) Int. Cl.
    *H01M 4/70* (2006.01)
    *H01M 10/0525* (2010.01)
    *H01M 10/054* (2010.01)

(52) U.S. Cl.
    CPC ..... *H01M 10/054* (2013.01); *H01M 10/0525* (2013.01); *H01M 2300/0082* (2013.01)

(56) References Cited

U.S. PATENT DOCUMENTS

| | | | |
|---|---|---|---|
| 9,941,506 | B2 | 4/2018 | Hiroki et al. |
| 2009/0035664 | A1 | 2/2009 | Chiang et al. |
| 2014/0363744 | A1 | 12/2014 | Vereecken et al. |
| 2016/0013469 | A1 | 1/2016 | Tajima et al. |
| 2016/0204464 | A1 | 7/2016 | Cho et al. |

FOREIGN PATENT DOCUMENTS

| | | | |
|---|---|---|---|
| JP | 2007042531 A | | 2/2007 |
| JP | 2010528424 A | | 8/2010 |
| JP | 2012043770 A | | 3/2012 |
| JP | 2012119236 A | | 6/2012 |
| JP | 2014241275 A | | 12/2014 |
| JP | 2015015143 A | | 1/2015 |
| JP | 2016027542 A | | 2/2016 |
| JP | 2016066594 A | | 4/2016 |
| WO | 2016049444 A1 | | 3/2016 |

OTHER PUBLICATIONS

Xu et al. (Stretchable batteries with self-similar serpentine interconnects and integrated wireless recharging systems. Nat Commun. 4, 1543 (2013)) (Year: 2013).*
Tsao et al. (Stable Lithium Deposition Generated from Ceramic-Cross-Linked Gel Polymer Electrolytes for Lithium Anode. ACS Appl. Mater. Interfaces 2016, 8, 24, 15216-15224) (Year: 2016).*
Long et al. (Three-Dimensional Battery Architectures. Chem. Rev. 2004, 104, 4463-4492) (Year: 2004).*
Notice of Reasons for Refusal for Japanese Application No. 2019550140 dated Dec. 14, 2021; Machine Translation Included; 7 pages.
Search Report for Japanese Application No. 2019550140 dated Nov. 9, 2021; Machine Translation Included; 23 pages.
International Search Report for Application No. PCT/FR2018/050385 (15 pages).
Jae-Yong Choi et al: "Silicon Nanofibrils on a Flexible Current Collector for Bendable Lithium-Ion Battery Anodes". Advanced Functional Materials, vol. 23, No. 17; May 6, 2013.
Min Koo et al. "Bendable Inorganic Thin-Film Battery for Fully Flexible Electronic Systems", vol. 12, No. 9, pp. 4810-4816 ; Sep. 12, 2012.
Pandey et al.; "Toward highly stable solid-state unconventional thin-film battery-supercapacitor hybrid devices: Interfacing vertical core-shell array electrodes with a gel polymer electrolyte", Journal of Power Sources, vol. 342, pp. 1006-1016; Jan. 22, 2017.
Sheng et al: "Stretchable batteries with self-similar serpentine interconnects and integrated wireless recharging systems", Nature Communications, vol. 4, pp. 1-8; Feb. 26, 2013.
Written Opinion for Application No. PCT/FR2018/050385 (7 pages).
English translation of First Office Action issued in in Chinese Patent Application No. 2018800318237 dated May 31, 2022.

* cited by examiner

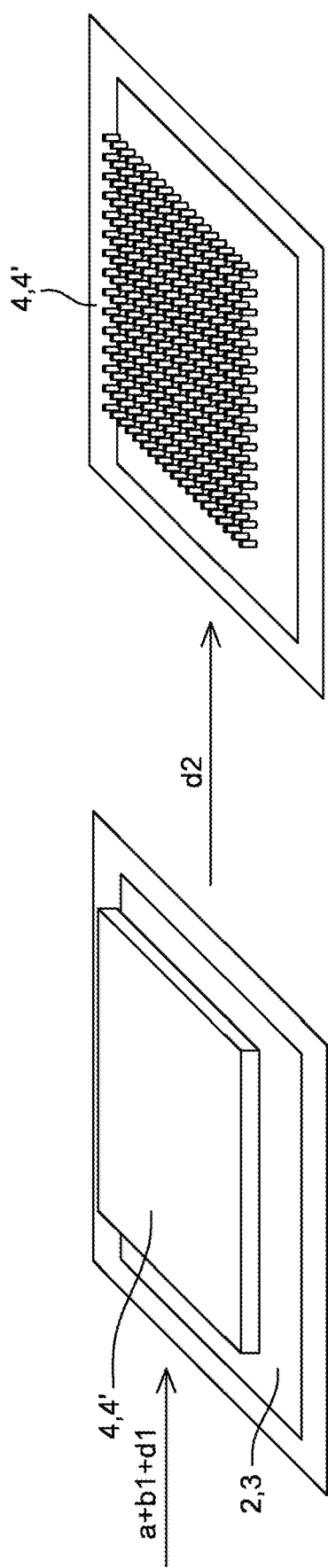
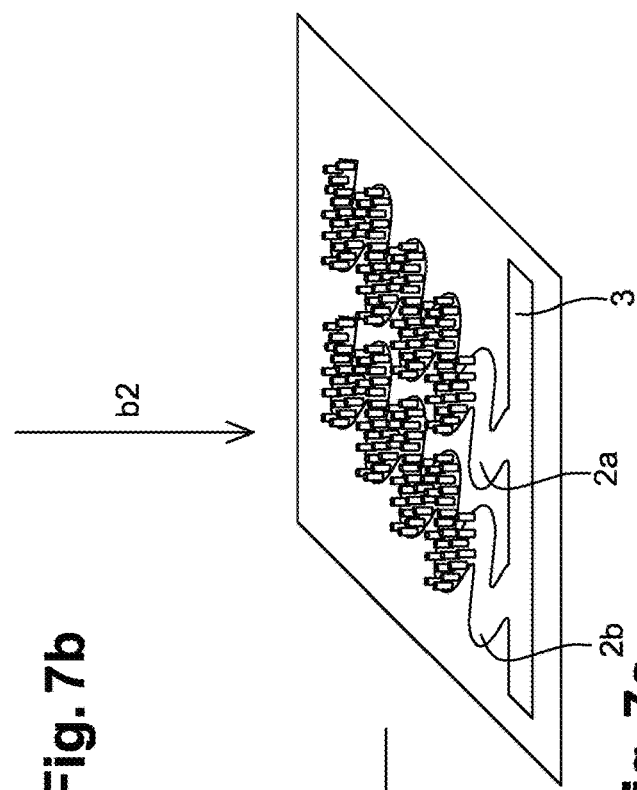
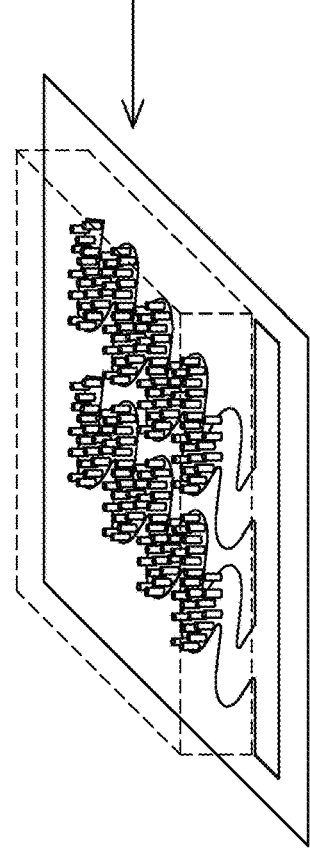
Fig. 7a
Fig. 7b
Fig. 7c
Fig. 7d

DEFORMABLE ACCUMULATOR

CROSS REFERENCE TO RELATED APPLICATIONS

This application is a National Stage of PCT Application No. PCT/FR2018/050385 filed on Feb. 19, 2018, which claims priority to French Patent Application No. 17/52113 filed on Mar. 15, 2017, the contents each of which are incorporated herein by reference thereto.

TECHNICAL FIELD

The present invention concerns the field of stretchable electronics, and more particularly that of deformable electrical energy storage elements, or accumulators.

BACKGROUND

Numerous researches aim at developing deformable electrical capacities or batteries.

It is in particular known to deposit on stretchable substrates millimetric island-like arrays of active electrodes in the form of thin layers connected to each other by serpentines used as stretchable current collectors. This configuration allows stretchings of 300% but has the disadvantage of mobilizing a large part of the surface for serpentine interconnections. Thus, less than 30% of the total surface is occupied by the active materials of the batteries.

It is also known to deposit the metal contacts on a pre-stretched active material, thus generating a configuration in «wavelets» when the pre-stretched substrate has returned to its initial shape. The limit of this method is related to the initial pre-stretching rate, which is generally quite low.

Finally, it is also known to weave fibers having electrical energy storage properties; the extensibility is then naturally ensured by weaving. The disadvantage of this method is that it requires to house all the multilayer electrochemistry of a Li-ion battery within the very limited volume of a fiber.

BRIEF SUMMARY

The purpose of the invention is to propose an electrochemical storage device of the energy of the accumulator type, allowing to improve the results obtained so far in terms of electrochemical performances (high energy and power density per surface unit) when the device is stressed by long-term cyclic mechanical stresses.

To this end, the present invention concerns a deformable accumulator comprising:
  a. first and second deformable planar substrates,
  b. at least one first current collector deposited on at least a part of a face of the first substrate, close to and along at least one first curved line portion whose length is greater than the distance between its two ends,
  c. at least one second current collector deposited on at least a part of a face of the second substrate, close to and on each side of at least one second curved line whose length is greater than the distance between its two ends,
  d. an anode consisting of a first set of pillars, deposited on the at least one first current collector, the pillars of the first set being spaced from each other on a surface of the first collector,
  e. a cathode consisting of a second set of pillars, deposited on the at least one second current collector, the pillars of the second set being spaced from each other on a surface of the second collector,
  f. an electrolyte allowing the transfer of the ionic species, the faces of the first and the second substrate, on which are deposited respectively the at least one first and the at least one second current collector, being placed facing each other and delimiting a volume occupied by the electrolyte in which the pillars of the anode and the cathode are immersed.

According to one aspect of the invention, the electrolyte is a self-healing polymer.

According to one aspect of the invention, the height of a first pillar of the first set being less than a first height, and the height of the second pillars of the second set which are facing this first pillar being less than a second height, the distance that separates the faces of the first and the second substrate facing each other around the first pillar is greater than the sum of the first height and the second height.

According to one aspect of the invention, the width of the current collectors is comprised between 100 µm and 400 µm.

According to one aspect of the invention, the pillars are spaced by a distance comprised between 0.1 µm and 20 µm.

According to one aspect of the invention, the pillars are spaced by a distance comprised between 2 µm and 10 µm.

According to one aspect of the invention, the pillars have a height comprised between 1 µm and 1000 µm.

According to one aspect of the invention, the pillars have a height comprised between 10 µm and 100 µm.

According to one aspect of the invention, the pillars have a width comprised between 1 µm and 100 µm.

According to one aspect of the invention, the pillars have a width comprised between 2 µm and 10 µm.

The invention also relates to a method for manufacturing an accumulator according to any of the preceding claims, comprising the following steps:
  a. Preparing a first and a second substrate;
  b. Depositing at least one first current collector on at least a part of a face of the first substrate, close to and along at least one first curved line portion whose length is greater than the distance between its two ends,
  c. Depositing at least one second current collector on at least a part of a face of the second substrate, close to and on each side of at least one second curved line whose length is greater than the distance between its two ends,
  d. Depositing an anode consisting of a first set of pillars, on the at least one first current collector, the pillars of the first set being spaced from each other on a surface of the first collector,
  e. Depositing a cathode consisting of a second set of pillars, on the at least one second current collector, the pillars of the second set being spaced from each other on a surface of the second collector,
  f. Depositing an electrolyte on the faces of the first and the second substrate on which are deposited respectively the at least one first and the at least one second current collector while immersing the pillars of the anode and the cathode in the electrolyte, then placing these faces facing each other
    or
    placing the faces of the first and the second substrate, on which are deposited respectively the at least one first and the at least one second current collector, facing each other, then depositing an electrolyte in the volume delimited by these faces while immersing the pillars of the anode and the cathode in the electrolyte.

BRIEF DESCRIPTION OF THE DRAWINGS

For the good understanding thereof, the invention is described with reference to the appended drawings showing, by way of a non-limiting example, an embodiment of a product according to the invention.

FIGS. 7a, 7b, 7c, 7d schematically show the intermediate products of a manufacturing method according to the invention.

DETAILED DESCRIPTION

It is known that an accumulator is composed of the following elements:
- A first current collector in contact with a negative electrode, called anode, which releases electrons in the circuit during the discharge.
- A second current collector in contact with a positive electrode, called cathode, which captures the electrons coming from the circuit during the discharge.
- A separator impregnated with an electrolyte allowing to prevent short-circuits while ensuring the transport of ions from different electrochemical reactions occurring at the electrodes.
- The charge transfers (electrons and ionic species) occur in the opposite direction when the accumulator is charging.

It is also known that some materials, of the polymer type, called self-healing polymer, has the particular property of spontaneously regenerating in case of internal mechanical fracture of the material, by the effect of a spontaneous reaction of local polymerization which allows the material to be reconstituted at the fracture location.

The accumulator according to the invention is characterized on the one hand by the shape of the current collectors which is elongated and folded back on itself, a shape that makes them look like serpentines, on the other hand by the fact that the anode and the cathode are structured into a set of rows of micro-pillars whose base rests on its respective current collector.

According to one embodiment of the invention, each current collector is made either on a flexible substrate that can be bent such as PET, polyimide, KAPTON, or on a conformable substrate that can be stretched such as polydimethylsiloxane (PDMS), or polyurethane.

The material of the current collector can be selected from the various known conductive materials, for example a metal, such as gold, copper, titanium or aluminum.

The material deposition method can be selected from one of the known methods, for example a metal vapor phase deposition method, lamination method, or more recent techniques such as the printing of conductive materials by screen-printing/ink-jet printing. Making the serpentine patterns can be carried out additively by the deposition of material through a mask allowing to delimit the deposition area of the current collector. They can also be made subtractively by photolithography or else by laser lithography, electron or ion beam lithography.

Figure 1:
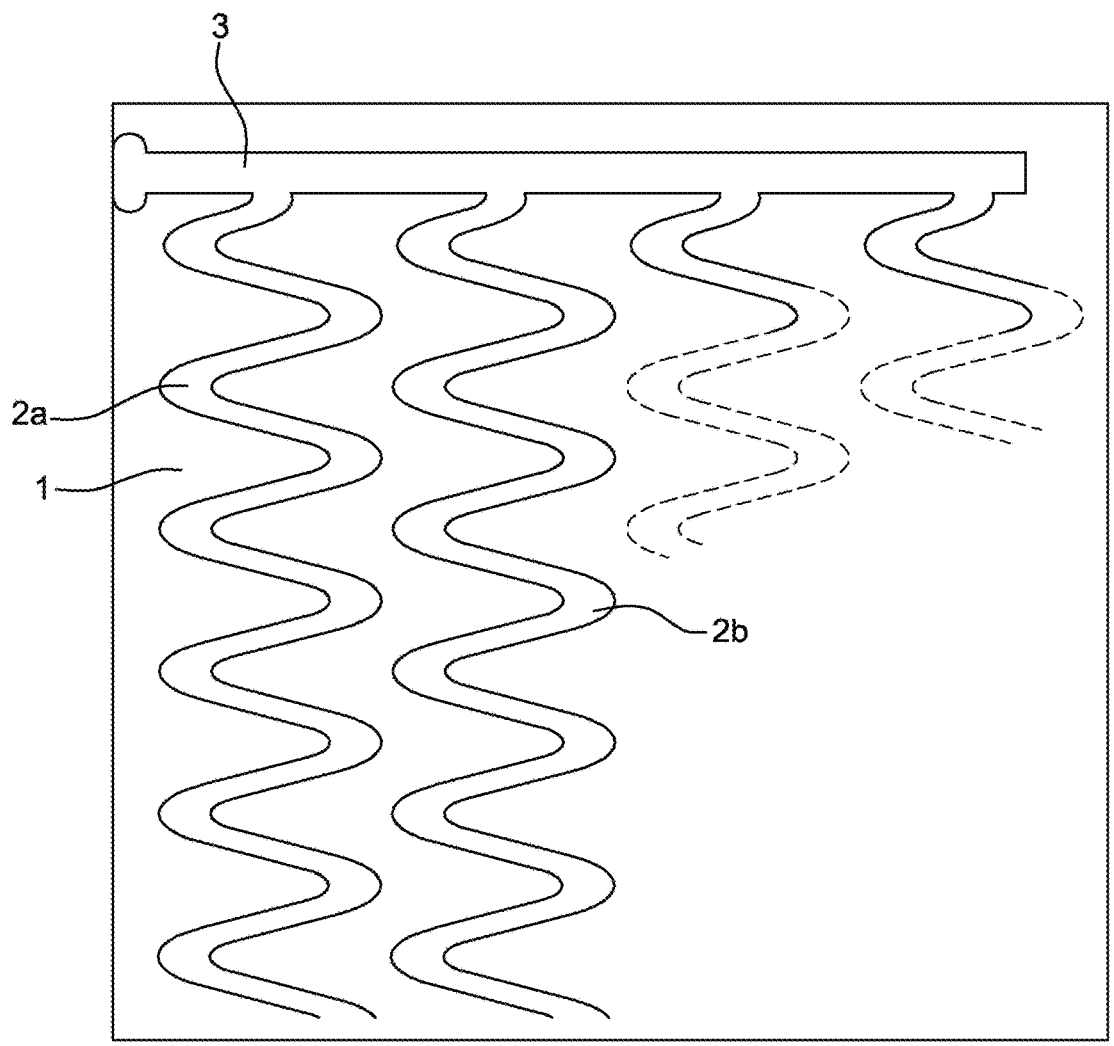
FIG. 1 shows a schematic top view of the substrate serving as a support for one of the two electrodes of the electrical energy storage element according to the invention.
Figure 6A:
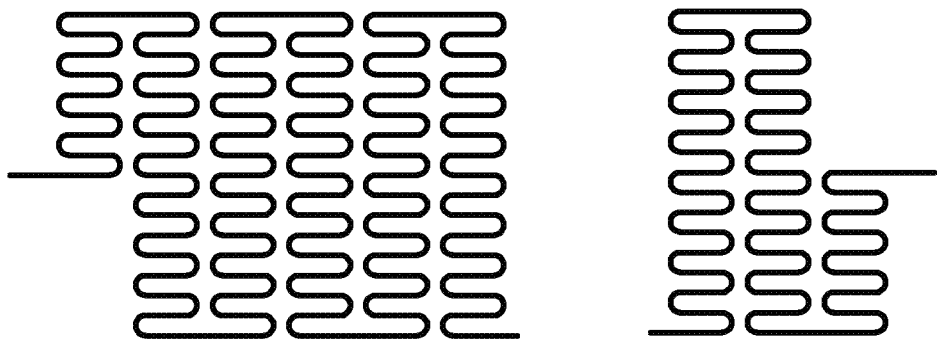
FIGS. 6a, 6b, 6c show three examples of serpentine meshes having a bidirectional periodicity in the plane of the substrate.
Figure 6B:
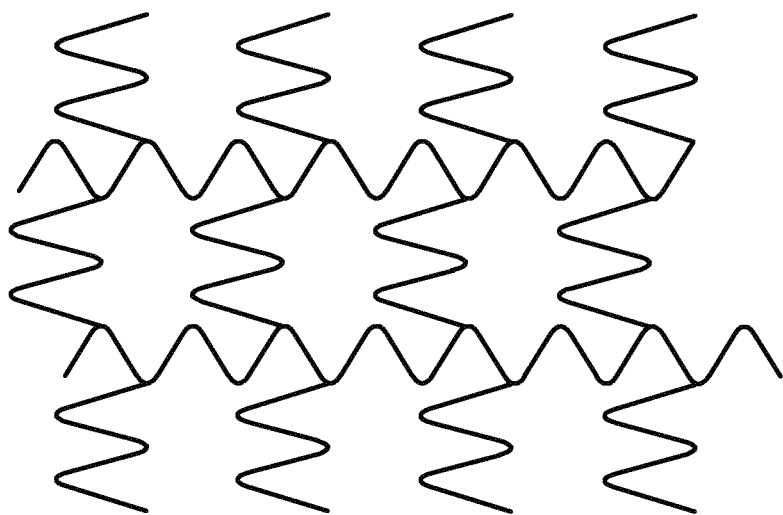
Figure 6C:
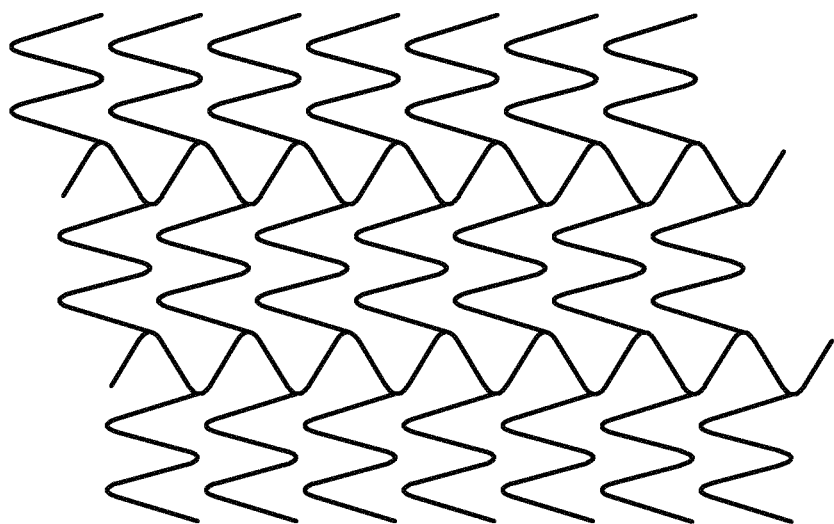

FIG. 1 shows a top view of a flat-blade-shaped substrate 1 on which is deposited a current collector consisting of several serpentines 2a, 2b, ... in contact with a common part 3 constituting a pole of the electrical energy storage element. The shape of the serpentines, which is elongated and folded back on itself, has the advantage of being able to be deformed and stretched many times without the physical and electrical continuity of the current collector being broken. The width of the lines of these serpentines is of the order of one hundred micrometers or less, preferably comprised between 100 µm and 400 µm. The precise shape of the serpentines is determined so as to maximize the surface of the current collector without impairing its extensibility. The serpentines may have a corrugation periodicity in one direction, thus supporting only a uniaxial traction, or in two directions in order to support a bi-axial deformation of the substrate. Examples of serpentine meshes having a periodicity in both directions are shown in FIGS. 6a, 6b, and 6c.

Figure 2:
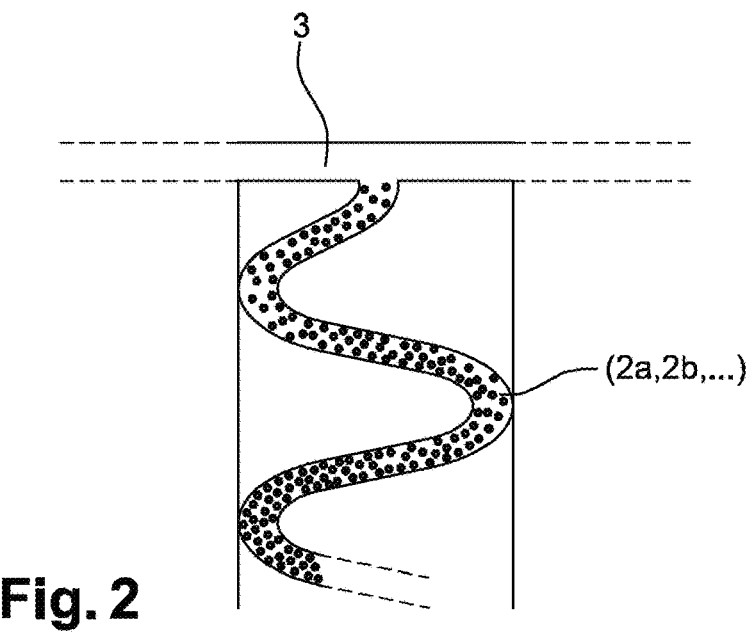
FIG. 2 shows a schematic top view of a portion of a current collector deposited on the substrate shown in FIG. 1.
Figure 3:
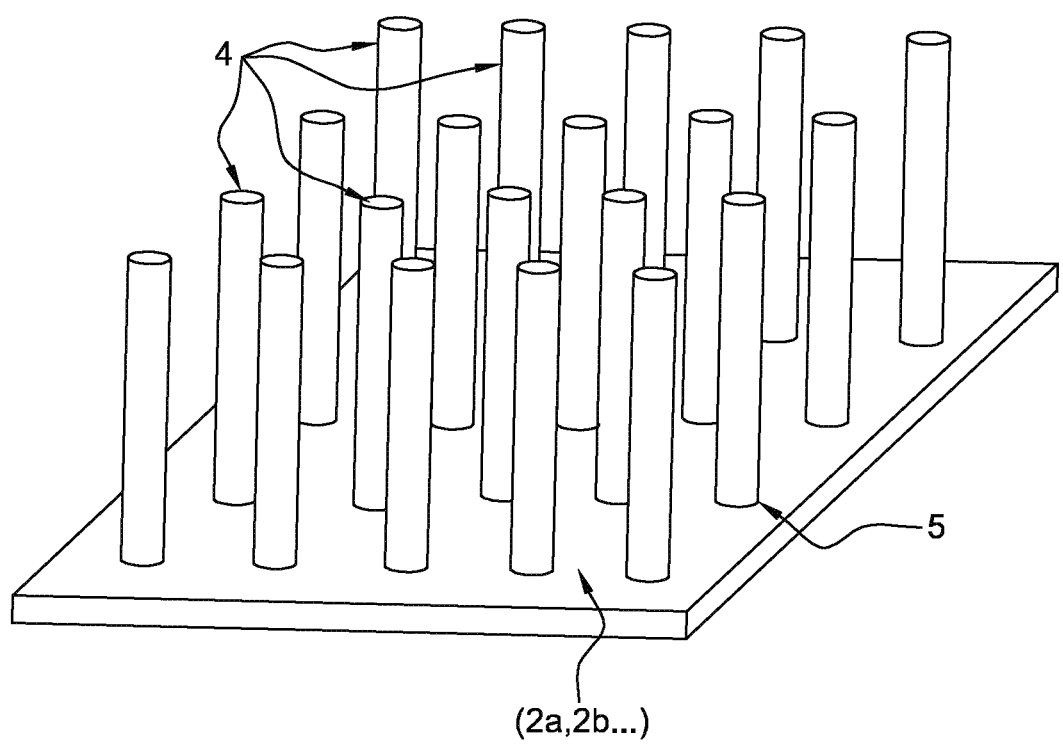
FIG. 3 shows another schematic and perspective view of a portion of a current collector deposited on the substrate shown in FIG. 1.

According to one embodiment of the invention, each current collector is associated with an electrode deposited on the current collector and structured into a set of micro-pillars 4, with a substantially cylindrical shape, each cylindrical pillar having one of its bases placed on the serpentine, as shown schematically and in perspective in FIG. 3. In FIG. 2 a schematic top view shows the imprint of the micro-pillars forming one of the electrodes on one of the serpentine current collectors.

The diameter, or the width, of the base of the micro-pillars is of the order of a few micrometers, preferably comprised between 1 µm and 100 µm, more advantageously between 2 µm and 10 µm.

The height of the micro-pillars is of the order of a few tens of micrometers, preferably comprised between 1 µm and 1000 µm, more advantageously between 10 µm and 100 µm.

The spacing between the micro-pillars is of the order of a few micrometers, preferably comprised between 0.1 µm and 20 µm, more advantageously between 2 µm and 10 µm.

The active material used to form the anode can be selected from the lithiated and/or sodium containing active materials known for the anode function, such as lithium metal; sodium metal; silicon; bismuth; intermetallics such as SnSb; lithiated nitrides such as $LiM_yN_2$ where M represents Fe, Co, Ni, Mn or Cu and y is the stoichiometric coefficient of the metal; carbon compounds such as carbon, $LiC_6$ or graphene; tin alloys such as Sn or SnM where M represents Fe, Co, Ni, Mn, or Cu; tin oxides such as SnO and $SnO_2$, transition metal oxides such as $TiO_2$; and lithiated oxides such as $Li_4Ti_5O_{12}$ (LTO).

The active material used to form the cathode can be selected from the lithiated and/or sodium containing active materials known for the cathode function, such as manganese oxides, in particular $MnO_2$, $LiMn_2O_4$, $LiNi_{0.5}Mn_{1.5}O_4$, $LiCoO_2$, $LiTiS_2$; vanadium oxides such as $V_2O_5$, $LiV_3O_8$; inorganic polyanionic compounds like phosphates such as $LiMPO_4$ where M represents Fe, Co, Ni, Mn or Cu; fluorophosphates such as $LiFePO_4F$ or such as $Li_2Co_{1-x}M_xPO_4F$ with M represents Fe or Mn, and x is the stoichiometric coefficient of the metal; or cuprophosphates such as $Cu_3(PO_4)_2$.

As preferred examples of deformable accumulators according to the present invention, in particular there may be mentioned deformable accumulators in which:

The anode consists of lithium and the cathode of $MnO_2$;
The anode consists of lithium and the cathode of $LiMn_2O_4$;
The anode consists of lithium and the cathode of $LiNi_{0.5}Mn_{1.5}O_4$;
The anode consists of lithium and the cathode of $LiCoO_2$;
The anode consists of lithium and the cathode of $LiTiS_2$;
The anode consists of lithium and the cathode of $V_2O_5$;
The anode consists of lithium and the cathode of $LiV_3O_8$;
The anode consists of lithium and the cathode of $LiFePO_4$;
The anode consists of lithium and the cathode of $LiCoPO_4$;
The anode consists of lithium and the cathode of $LiNiPO_4$;
The anode consists of lithium and the cathode of $LiMnPO_4$;
The anode consists of lithium and the cathode of $LiCuPO_4$;
The anode consists of lithium and the cathode of $LiFePO_4F$;
The anode consists of lithium and the cathode of $Cu_3(PO_4)_2$;
The anode consists of lithium and the cathode of $Li_2Co_{1-x}Fe_xPO_4F$;
The anode consists of lithium and the cathode of $Li_2Co_{1-x}FeMn_xPO_4F$;
The anode consists of carbon and the cathode of $MnO_2$;
The anode consists of carbon and the cathode of $LiMn_2O_4$;
The anode consists of carbon and the cathode of $LiNi_{0.5}Mn_{1.5}O_4$;
The anode consists of carbon and the cathode of $LiCoO_2$;
The anode consists of carbon and the cathode of $LiTiS_2$;
The anode consists of carbon and the cathode of $V_2O_5$;
The anode consists of carbon and the cathode of $LiV_3O_8$;
The anode consists of carbon and the cathode of $LiFePO_4$;
The anode consists of carbon and the cathode of $LiCoPO_4$;
The anode consists of carbon and the cathode of $LiNiPO_4$;
The anode consists of carbon and the cathode of $LiMnPO_4$;
The anode consists of carbon and the cathode of $LiCuPO_4$;
The anode consists of carbon and the cathode of $LiFePO_4F$;
The anode consists of carbon and the cathode of $Cu_3(PO_4)_2$;
The anode consists of carbon and the cathode of $Li_2Co_{1-x}Fe_xPO_4F$;
The anode consists of carbon and the cathode of $Li_2Co_{1-x}FeMn_xPO_4F$;
The anode consists of graphene and the cathode of $MnO_2$;
The anode consists of graphene and the cathode of $LiMn_2O_4$;
The anode consists of graphene and the cathode of $LiNi_{0.5}Mn_{1.5}O_4$;
The anode consists of graphene and the cathode of $LiCoO_2$;
The anode consists of graphene and the cathode of $LiTiS_2$;
The anode consists of graphene and the cathode of $V_2O_5$;
The anode consists of graphene and the cathode of $LiV_3O_8$;
The anode consists of graphene and the cathode of $LiFePO_4$;
The anode consists of graphene and the cathode of $LiCoPO_4$;
The anode consists of graphene and the cathode of $LiNiPO_4$;
The anode consists of graphene and the cathode of $LiMnPO_4$;
The anode consists of graphene and the cathode of $LiCuPO_4$;
The anode consists of graphene and the cathode of $LiFePO_4F$;
The anode consists of graphene and the cathode of $Cu_3(PO_4)_2$;
The anode consists of graphene and the cathode of $Li_2Co_{1-x}Fe_xPO_4F$;
The anode consists of graphene and the cathode of $Li_2Co_{1-x}FeMn_xPO_4F$;
The anode consists of Sn and the cathode of $MnO_2$;
The anode consists of Sn and the cathode of $LiMn_2O_4$;
The anode consists of Sn and the cathode of $LiNi_{0.5}Mn_{1.5}O_4$;
The anode consists of Sn and the cathode of $LiCoO_2$;
The anode consists of Sn and the cathode of $LiTiS_2$;
The anode consists of Sn and the cathode of $V_2O_5$;
The anode consists of Sn and the cathode of $LiV_3O_8$;
The anode consists of Sn and the cathode of $LiFePO_4$;
The anode consists of Sn and the cathode of $LiCoPO_4$;
The anode consists of Sn and the cathode of $LiNiPO_4$;
The anode consists of Sn and the cathode of $LiMnPO_4$;
The anode consists of Sn and the cathode of $LiCuPO_4$;
The anode consists of Sn and the cathode of $LiFePO_4F$;
The anode consists of Sn and the cathode of $Cu_3(PO_4)_2$;
The anode consists of Sn and the cathode of $Li_2Co_{1-x}Fe_xPO_4F$;
The anode consists of Sn and the cathode of $Li_2Co_{1-x}FeMn_xPO_4F$;
The anode consists of SnFe and the cathode of $MnO_2$;
The anode consists of SnFe and the cathode of $LiMn_2O_4$;
The anode consists of SnFe and the cathode of $LiNi_{0.5}Mn_{1.5}O_4$;
The anode consists of SnFe and the cathode of $LiCoO_2$;
The anode consists of SnFe and the cathode of $LiTiS_2$;
The anode consists of SnFe and the cathode of $V_2O_5$;
The anode consists of SnFe and the cathode of $LiV_3O_8$;
The anode consists of SnFe and the cathode of $LiFePO_4$;
The anode consists of SnFe and the cathode of $LiCoPO_4$;
The anode consists of SnFe and the cathode of $LiNiPO_4$;
The anode consists of SnFe and the cathode of $LiMnPO_4$;
The anode consists of SnFe and the cathode of $LiCuPO_4$;
The anode consists of SnFe and the cathode of $LiFePO_4F$;
The anode consists of SnFe and the cathode of $Cu_3(PO_4)_2$;
The anode consists of SnFe and the cathode of $Li_2Co_{1-x}Fe_xPO_4F$;
The anode consists of SnFe and the cathode of $Li_2Co_{1-x}FeMn_xPO_4F$;
The anode consists of SnCo and the cathode of $MnO_2$;
The anode consists of SnCo and the cathode of $LiMn_2O_4$;
The anode consists of SnCo and the cathode of $LiNi_{0.5}Mn_{1.5}O_4$;
The anode consists of SnCo and the cathode of $LiCoO_2$;
The anode consists of SnCo and the cathode of $LiTiS_2$;
The anode consists of SnCo and the cathode of $V_2O_5$;
The anode consists of SnCo and the cathode of $LiV_3O_8$;
The anode consists of SnCo and the cathode of $LiFePO_4$;
The anode consists of SnCo and the cathode of $LiCoPO_4$;
The anode consists of SnCo and the cathode of $LiNiPO_4$;
The anode consists of SnCo and the cathode of $LiMnPO_4$;
The anode consists of SnCo and the cathode of $LiCuPO_4$;
The anode consists of SnCo and the cathode of $LiFePO_4F$;

The anode consists of SnCo and the cathode of $Cu_3(PO_4)_2$;
The anode consists of SnCo and the cathode of $Li_2Co_{1-x}Fe_xPO_4F$;
The anode consists of SnCo and the cathode of $Li_2Co_{1-x}FeMn_xPO_4F$;
The anode consists of SnNi and the cathode of $MnO_2$;
The anode consists of SnNi and the cathode of $LiMn_2O_4$;
The anode consists of SnNi and the cathode of $LiNi_{0.5}Mn_{1.5}O_4$;
The anode consists of SnNi and the cathode of $LiCoO_2$;
The anode consists of SnNi and the cathode of $LiTiS_2$;
The anode consists of SnNi and the cathode of $V_2O_5$;
The anode consists of SnNi and the cathode of $LiV_3O_8$;
The anode consists of SnNi and the cathode of $LiFePO_4$;
The anode consists of SnNi and the cathode of $LiCoPO_4$;
The anode consists of SnNi and the cathode of $LiNiPO_4$;
The anode consists of SnNi and the cathode of $LiMnPO_4$;
The anode consists of SnNi and the cathode of $LiCuPO_4$;
The anode consists of SnNi and the cathode of $LiFePO_4F$;
The anode consists of SnNi and the cathode of $Cu_3(PO_4)_2$;
The anode consists of SnNi and the cathode of $Li_2Co_{1-x}Fe_xPO_4F$;
The anode consists of SnNi and the cathode of $Li_2Co_{1-x}FeMn_xPO_4F$;
The anode consists of SnMn and the cathode of $MnO_2$;
The anode consists of SnMn and the cathode of $LiMn_2O_4$;
The anode consists of SnMn and the cathode of $LiNi_{0.5}Mn_{1.5}O_4$;
The anode consists of SnMn and the cathode of $LiCoO_2$;
The anode consists of SnMn and the cathode of $LiTiS_2$;
The anode consists of SnMn and the cathode of $V_2O_5$;
The anode consists of SnMn and the cathode of $LiV_3O_8$;
The anode consists of SnMn and the cathode of $LiFePO_4$;
The anode consists of SnMn and the cathode of $LiCoPO_4$;
The anode consists of SnMn and the cathode of $LiNiPO_4$;
The anode consists of SnMn and the cathode of $LiMnPO_4$;
The anode consists of SnMn and the cathode of $LiCuPO_4$;
The anode consists of SnMn and the cathode of $LiFePO_4F$;
The anode consists of SnMn and the cathode of $Cu_3(PO_4)_2$;
The anode consists of SnMn and the cathode of $Li_2Co_{1-x}Fe_xPO_4F$;
The anode consists of SnMn and the cathode of $Li_2Co_{1-x}FeMn_xPO_4F$;
The anode consists of SnCu and the cathode of $MnO_2$;
The anode consists of SnCu and the cathode of $LiMn_2O_4$;
The anode consists of SnCu and the cathode of $LiNi_{0.5}Mn_{1.5}O_4$;
The anode consists of SnCu and the cathode of $LiCoO_2$;
The anode consists of SnCu and the cathode of $LiTiS_2$;
The anode consists of SnCu and the cathode of $V_2O_5$;
The anode consists of SnCu and the cathode of $LiV_3O_8$;
The anode consists of SnCu and the cathode of $LiFePO_4$;
The anode consists of SnCu and the cathode of $LiCoPO_4$;
The anode consists of SnCu and the cathode of $LiNiPO_4$;
The anode consists of SnCu and the cathode of $LiMnPO_4$;
The anode consists of SnCu and the cathode of $LiCuPO_4$;
The anode consists of SnCu and the cathode of $LiFePO_4F$;
The anode consists of SnCu and the cathode of $Cu_3(PO_4)_2$;
The anode consists of SnCu and the cathode of $Li_2Co_{1-x}Fe_xPO_4F$;
The anode consists of SnCu and the cathode of $Li_2Co_{1-x}FeMn_xPO_4F$;
The anode consists of SnO and the cathode of $MnO_2$;
The anode consists of SnO and the cathode of $LiMn_2O_4$;
The anode consists of SnO and the cathode of $LiNi_{0.5}Mn_{1.5}O_4$;
The anode consists of SnO and the cathode of $LiCoO_2$;
The anode consists of SnO and the cathode of $LiTiS_2$;
The anode consists of SnO and the cathode of $V_2O_5$;
The anode consists of SnO and the cathode of $LiV_3O_8$;
The anode consists of SnO and the cathode of $LiFePO_4$;
The anode consists of SnO and the cathode of $LiCoPO_4$;
The anode consists of SnO and the cathode of $LiNiPO_4$;
The anode consists of SnO and the cathode of $LiMnPO_4$;
The anode consists of SnO and the cathode of $LiCuPO_4$;
The anode consists of SnO and the cathode of $LiFePO_4F$;
The anode consists of SnO and the cathode of $Cu_3(PO_4)_2$;
The anode consists of SnO and the cathode of $Li_2Co_{1-x}Fe_xPO_4F$;
The anode consists of SnO and the cathode of $Li_2Co_{1-x}FeMn_xPO_4F$;
The anode consists of $SnO_2$ and the cathode of $MnO_2$;
The anode consists of $SnO_2$ and the cathode of $LiMn_2O_4$;
The anode consists of $SnO_2$ and the cathode of $LiNi_{0.5}Mn_{1.5}O_4$;
The anode consists of $SnO_2$ and the cathode of $LiCoO_2$;
The anode consists of $SnO_2$ and the cathode of $LiTiS_2$;
The anode consists of $SnO_2$ and the cathode of $V_2O_5$;
The anode consists of $SnO_2$ and the cathode of $LiV_3O_8$;
The anode consists of $SnO_2$ and the cathode of $LiFePO_4$;
The anode consists of $SnO_2$ and the cathode of $LiCoPO_4$;
The anode consists of $SnO_2$ and the cathode of $LiNiPO_4$;
The anode consists of $SnO_2$ and the cathode of $LiMnPO_4$;
The anode consists of $SnO_2$ and the cathode of $LiCuPO_4$;
The anode consists of $SnO_2$ and the cathode of $LiFePO_4F$;
The anode consists of $SnO_2$ and the cathode of $Cu_3(PO_4)_2$;
The anode consists of $SnO_2$ and the cathode of $Li_2Co_{1-x}Fe_xPO_4F$;
The anode consists of $SnO_2$ and the cathode of $Li_2Co_{1-x}FeMn_xPO_4F$;
The anode consists of $LiC_6$ and the cathode of $MnO_2$;
The anode consists of $LiC_6$ and the cathode of $LiMn_2O_4$;
The anode consists of $LiC_6$ and the cathode of $LiNi_{0.5}Mn_{1.5}O_4$;
The anode consists of $LiC_6$ and the cathode of $LiCoO_2$;
The anode consists of $LiC_6$ and the cathode of $LiTiS_2$;
The anode consists of $LiC_6$ and the cathode of $V_2O_5$;
The anode consists of $LiC_6$ and the cathode of $LiV_3O_8$;
The anode consists of $LiC_6$ and the cathode of $LiFePO_4$;
The anode consists of $LiC_6$ and the cathode of $LiCoPO_4$;
The anode consists of $LiC_6$ and the cathode of $LiNiPO_4$;
The anode consists of $LiC_6$ and the cathode of $LiMnPO_4$;
The anode consists of $LiC_6$ and the cathode of $LiCuPO_4$;
The anode consists of $LiC_6$ and the cathode of $LiFePO_4F$;
The anode consists of $LiC_6$ and the cathode of $Cu_3(PO_4)_2$;
The anode consists of $LiC_6$ and the cathode of $Li_2Co_{1-x}Fe_xPO_4F$;
The anode consists of $LiC_6$ and the cathode of $Li_2Co_{1-x}FeMn_xPO_4F$;
The anode consists of silicon and the cathode of $MnO_2$;
The anode consists of silicon and the cathode of $LiMn_2O_4$;
The anode consists of silicon and the cathode of $LiNi_{0.5}Mn_{1.5}O_4$;
The anode consists of silicon and the cathode of $LiCoO_2$;
The anode consists of silicon and the cathode of $LiTiS_2$;
The anode consists of silicon and the cathode of $V_2O_5$;
The anode consists of silicon and the cathode of $LiV_3O_8$;

The anode consists of silicon and the cathode of LiFePO$_4$;
The anode consists of silicon and the cathode of LiCoPO$_4$;
The anode consists of silicon and the cathode of LiNiPO$_4$;
The anode consists of silicon and the cathode of LiMnPO$_4$;
The anode consists of silicon and the cathode of LiCuPO$_4$;
The anode consists of silicon and the cathode of LiFePO$_4$F;
The anode consists of silicon and the cathode of Cu$_3$(PO$_4$)$_2$;
The anode consists of silicon and the cathode of Li$_2$Co$_{1-x}$Fe$_x$PO$_4$F;
The anode consists of silicon and the cathode of Li$_2$Co$_{1-x}$FeMn$_x$PO$_4$F;
The anode consists of sodium and the cathode of MnO$_2$;
The anode consists of sodium and the cathode of LiMn$_2$O$_4$;
The anode consists of sodium and the cathode of LiNi$_{0.5}$Mn$_{1.5}$O$_4$;
The anode consists of sodium and the cathode of LiCoO$_2$;
The anode consists of sodium and the cathode of LiTiS$_2$;
The anode consists of sodium and the cathode of V$_2$O$_5$;
The anode consists of sodium and the cathode of LiV$_3$O$_8$;
The anode consists of sodium and the cathode of LiFePO$_4$;
The anode consists of sodium and the cathode of LiCoPO$_4$;
The anode consists of sodium and the cathode of LiNiPO$_4$;
The anode consists of sodium and the cathode of LiMnPO$_4$;
The anode consists of sodium and the cathode of LiCuPO$_4$;
The anode consists of sodium and the cathode of LiFePO$_4$F;
The anode consists of sodium and the cathode of Cu$_3$(PO$_4$)$_2$;
The anode consists of sodium and the cathode of Li$_2$Co$_{1-x}$Fe$_x$PO$_4$F;
The anode consists of sodium and the cathode of Li$_2$Co$_{1-x}$FeMn$_x$PO$_4$F;
The anode consists of bismuth and the cathode of MnO$_2$;
The anode consists of bismuth and the cathode of LiMn$_2$O$_4$;
The anode consists of bismuth and the cathode of LiNi$_{0.5}$Mn$_{1.5}$O$_4$;
The anode consists of bismuth and the cathode of LiCoO$_2$;
The anode consists of bismuth and the cathode of LiTiS$_2$;
The anode consists of bismuth and the cathode of V$_2$O$_5$;
The anode consists of bismuth and the cathode of LiV$_3$O$_8$;
The anode consists of bismuth and the cathode of LiFePO$_4$;
The anode consists of bismuth and the cathode of LiCoPO$_4$;
The anode consists of bismuth and the cathode of LiNiPO$_4$;
The anode consists of bismuth and the cathode of LiMnPO$_4$;
The anode consists of bismuth and the cathode of LiCuPO$_4$;
The anode consists of bismuth and the cathode of LiFePO$_4$F;
The anode consists of bismuth and the cathode of Cu$_3$(PO$_4$)$_2$;
The anode consists of bismuth and the cathode of Li$_2$Co$_{1-x}$Fe$_x$PO$_4$F;
The anode consists of bismuth and the cathode of Li$_2$Co$_{1-x}$FeMn$_x$PO$_4$F;
The anode consists of SnSb and the cathode of MnO$_2$;
The anode consists of SnSb and the cathode of LiMn$_2$O$_4$;
The anode consists of SnSb and the cathode of LiNi$_{0.5}$Mn$_{1.5}$O$_4$;
The anode consists of SnSb and the cathode of LiCoO$_2$;
The anode consists of SnSb and the cathode of LiTiS$_2$;
The anode consists of SnSb and the cathode of V$_2$O$_5$;
The anode consists of SnSb and the cathode of LiV$_3$O$_8$;
The anode consists of SnSb and the cathode of LiFePO$_4$;
The anode consists of SnSb and the cathode of LiCoPO$_4$;
The anode consists of SnSb and the cathode of LiNiPO$_4$;
The anode consists of SnSb and the cathode of LiMnPO$_4$;
The anode consists of SnSb and the cathode of LiCuPO$_4$;
The anode consists of SnSb and the cathode of LiFePO$_4$F;
The anode consists of SnSb and the cathode of Cu$_3$(PO$_4$)$_2$;
The anode consists of SnSb and the cathode of Li$_2$Co$_{1-x}$Fe$_x$PO$_4$F;
The anode consists of SnSb and the cathode of Li$_2$Co$_{1-x}$FeMn$_x$PO$_4$F;
The anode consists of LiFe$_y$N$_2$ and the cathode of MnO$_2$;
The anode consists of LiFe$_y$N$_2$ and the cathode of LiMn$_2$O$_4$;
The anode consists of LiFe$_y$N$_2$ and the cathode of LiNi$_{0.5}$Mn$_{1.5}$O$_4$;
The anode consists of LiFe$_y$N$_2$ and the cathode of LiCoO$_2$;
The anode consists of LiFe$_y$N$_2$ and the cathode of LiTiS$_2$;
The anode consists of LiFe$_y$N$_2$ and the cathode of V$_2$O$_5$;
The anode consists of LiFe$_y$N$_2$ and the cathode of LiV$_3$O$_8$;
The anode consists of LiFe$_y$N$_2$ and the cathode of LiFePO$_4$;
The anode consists of LiFe$_y$N$_2$ and the cathode of LiCoPO$_4$;
The anode consists of LiFe$_y$N$_2$ and the cathode of LiNiPO$_4$;
The anode consists of LiFe$_y$N$_2$ and the cathode of LiMnPO$_4$;
The anode consists of LiFe$_y$N$_2$ and the cathode of LiCuPO$_4$;
The anode consists of LiFe$_y$N$_2$ and the cathode of LiFePO$_4$F;
The anode consists of LiFe$_y$N$_2$ and the cathode of Cu$_3$(PO$_4$)$_2$;
The anode consists of LiFe$_y$N$_2$ and the cathode of Li$_2$Co$_{1-x}$Fe$_x$PO$_4$F;
The anode consists of LiFe$_y$N$_2$ and the cathode of Li$_2$Co$_{1-x}$FeMn$_x$PO$_4$F;
The anode consists of LiCo$_y$N$_2$ and the cathode of MnO$_2$;
The anode consists of LiCo$_y$N$_2$ and the cathode of LiMn$_2$O$_4$;
The anode consists of LiCo$_y$N$_2$ and the cathode of LiNi$_{0.5}$Mn$_{1.5}$O$_4$;
The anode consists of LiCo$_y$N$_2$ and the cathode of LiCoO$_2$;
The anode consists of LiCo$_y$N$_2$ and the cathode of LiTiS$_2$;
The anode consists of LiCo$_y$N$_2$ and the cathode of V$_2$O$_5$;
The anode consists of LiCo$_y$N$_2$ and the cathode of LiV$_3$O$_8$;
The anode consists of LiCo$_y$N$_2$ and the cathode of LiFePO$_4$;

The anode consists of $LiCoyN_2$ and the cathode of $LiCoPO_4$;

The anode consists of $LiCoyN_2$ and the cathode of $LiNiPO_4$;

The anode consists of $LiCoyN_2$ and the cathode of $LiMnPO_4$;

The anode consists of $LiCoyN_2$ and the cathode of $LiCuPO_4$;

The anode consists of $LiCoyN_2$ and the cathode of $LiFePO_4F$;

The anode consists of $LiCoyN_2$ and the cathode of $Cu_3(PO_4)_2$;

The anode consists of $LiCoyN_2$ and the cathode of $Li_2Co_{1-x}Fe_xPO_4F$;

The anode consists of $LiCoyN_2$ and the cathode of $Li_2Co_{1-x}FeMn_xPO_4F$;

The anode consists of $LiNiyN_2$ and the cathode of $MnO_2$;

The anode consists of $LiNiyN_2$ and the cathode of $LiMn_2O_4$;

The anode consists of $LiNiyN_2$ and the cathode of $LiNi_{0.5}Mn_{1.5}O_4$;

The anode consists of $LiNiyN_2$ and the cathode of $LiCoO_2$;

The anode consists of $LiNiyN_2$ and the cathode of $LiTiS_2$;

The anode consists of $LiNiyN_2$ and the cathode of $V_2O_5$;

The anode consists of $LiNiyN_2$ and the cathode of $LiV_3O_8$;

The anode consists of $LiNiyN_2$ and the cathode of $LiFePO_4$;

The anode consists of $LiNiyN_2$ and the cathode of $LiCoPO_4$;

The anode consists of $LiNiyN_2$ and the cathode of $LiNiPO_4$;

The anode consists of $LiNiyN_2$ and the cathode of $LiMnPO_4$;

The anode consists of $LiNiyN_2$ and the cathode of $LiCuPO_4$;

The anode consists of $LiNiyN_2$ and the cathode of $LiFePO_4F$;

The anode consists of $LiNiyN_2$ and the cathode of $Cu_3(PO_4)_2$;

The anode consists of $LiNiyN_2$ and the cathode of $Li_2Co_{1-x}Fe_xPO_4F$;

The anode consists of $LiNiyN_2$ and the cathode of $Li_2Co_{1-x}FeMn_xPO_4F$;

The anode consists of $LiMnyN_2$ and the cathode of $MnO_2$;

The anode consists of $LiMnyN_2$ and the cathode of $LiMn_2O_4$;

The anode consists of $LiMnyN_2$ and the cathode of $LiNi_{0.5}Mn_{1.5}O_4$;

The anode consists of $LiMnyN_2$ and the cathode of $LiCoO_2$;

The anode consists of $LiMnyN_2$ and the cathode of $LiTiS_2$;

The anode consists of $LiMnyN_2$ and the cathode of $V_2O_5$;

The anode consists of $LiMnyN_2$ and the cathode of $LiV_3O_8$;

The anode consists of $LiMnyN_2$ and the cathode of $LiFePO_4$;

The anode consists of $LiMnyN_2$ and the cathode of $LiCoPO_4$;

The anode consists of $LiMnyN_2$ and the cathode of $LiNiPO_4$;

The anode consists of $LiMnyN_2$ and the cathode of $LiMnPO_4$;

The anode consists of $LiMnyN_2$ and the cathode of $LiCuPO_4$;

The anode consists of $LiMnyN_2$ and the cathode of $LiFePO_4F$;

The anode consists of $LiMnyN_2$ and the cathode of $Cu_3(PO_4)_2$;

The anode consists of $LiMnyN_2$ and the cathode of $Li_2Co_{1-x}Fe_xPO_4F$;

The anode consists of $LiMnyN_2$ and the cathode of $Li_2Co_{1-x}FeMn_xPO_4F$;

The anode consists of $LiCuyN_2$ and the cathode of $MnO_2$;

The anode consists of $LiCuyN_2$ and the cathode of $LiMn_2O_4$;

The anode consists of $LiCuyN_2$ and the cathode of $LiNi_{0.5}Mn_{1.5}O_4$;

The anode consists of $LiCuyN_2$ and the cathode of $LiCoO_2$;

The anode consists of $LiCuyN_2$ and the cathode of $LiTiS_2$;

The anode consists of $LiCuyN_2$ and the cathode of $V_2O_5$;

The anode consists of $LiCuyN_2$ and the cathode of $LiV_3O_8$;

The anode consists of $LiCuyN_2$ and the cathode of $LiFePO_4$;

The anode consists of $LiCuyN_2$ and the cathode of $LiCoPO_4$;

The anode consists of $LiCuyN_2$ and the cathode of $LiNiPO_4$;

The anode consists of $LiCuyN_2$ and the cathode of $LiMnPO_4$;

The anode consists of $LiCuyN_2$ and the cathode of $LiCuPO_4$;

The anode consists of $LiCuyN_2$ and the cathode of $LiFePO_4F$;

The anode consists of $LiCuyN_2$ and the cathode of $Cu_3(PO_4)_2$;

The anode consists of $LiCuyN_2$ and the cathode of $Li_2Co_{1-x}Fe_xPO_4F$;

The anode consists of $LiCuyN_2$ and the cathode of $Li_2Co_{1-x}FeMn_xPO_4F$;

The anode consists of $TiO_2$ and the cathode of $MnO_2$;

The anode consists of $TiO_2$ and the cathode of $LiMn_2O_4$;

The anode consists of $TiO_2$ and the cathode of $LiNi_{0.5}Mn_{1.5}O_4$;

The anode consists of $TiO_2$ and the cathode of $LiCoO_2$;

The anode consists of $TiO_2$ and the cathode of $LiTiS_2$;

The anode consists of $TiO_2$ and the cathode of $V_2O_5$;

The anode consists of $TiO_2$ and the cathode of $LiV_3O_8$;

The anode consists of $TiO_2$ and the cathode of $LiFePO_4$;

The anode consists of $TiO_2$ and the cathode of $LiCoPO_4$;

The anode consists of $TiO_2$ and the cathode of $LiNiPO_4$;

The anode consists of $TiO_2$ and the cathode of $LiMnPO_4$;

The anode consists of $TiO_2$ and the cathode of $LiCuPO_4$;

The anode consists of $TiO_2$ and the cathode of $LiFePO_4F$;

The anode consists of $TiO_2$ and the cathode of $Cu_3(PO_4)_2$;

The anode consists of $TiO_2$ and the cathode of $Li_2Co_{1-x}Fe_xPO_4F$;

The anode consists of $TiO_2$ and the cathode of $Li_2Co_{1-x}FeMn_xPO_4F$;

The anode consists of $Li_4Ti_5O_{12}$ and the cathode of $MnO_2$;

The anode consists of $Li_4Ti_5O_{12}$ and the cathode of $LiMn_2O_4$;

The anode consists of $Li_4Ti_5O_{12}$ and the cathode of $LiNi_{0.5}Mn_{1.5}O_4$;

The anode consists of $Li_4Ti_5O_{12}$ and the cathode of $LiCoO_2$;

The anode consists of $Li_4Ti_5O_{12}$ and the cathode of $LiTiS_2$;

The anode consists of $Li_4Ti_5O_{12}$ and the cathode of $V_2O_5$;

The anode consists of $Li_4Ti_5O_{12}$ and the cathode of $LiV_3O_8$;

The anode consists of $Li_4Ti_5O_{12}$ and the cathode of $LiFePO_4$;

The anode consists of $Li_4Ti_5O_{12}$ and the cathode of $LiCoPO_4$;

The anode consists of $Li_4Ti_5O_{12}$ and the cathode of $LiNiPO_4$;

The anode consists of $Li_4Ti_5O_{12}$ and the cathode of $LiMnPO_4$;

The anode consists of $Li_4Ti_5O_{12}$ and the cathode of $LiCuPO_4$;

The anode consists of $Li_4Ti_5O_{12}$ and the cathode of $LiFePO_4F$;

The anode consists of $Li_4Ti_5O_{12}$ and the cathode of $Cu_3(PO_4)_2$;

The anode consists of $Li_4Ti_5O_{12}$ and the cathode of $Li_2Co_{1-x}Fe_xPO_4F$;

The anode consists of $Li_4Ti_5O_{12}$ and the cathode of $Li_2Co_{1-x}FeMn_xPO_4F$;

The method for depositing and structuring each electrode into micro-pillar is selected, from the known layer deposition methods, adapted to the considered active material. In particular, there can be considered conventional methods such as spin coating, dip-coating, doctor blade, or electrode-position.

Figure 4:
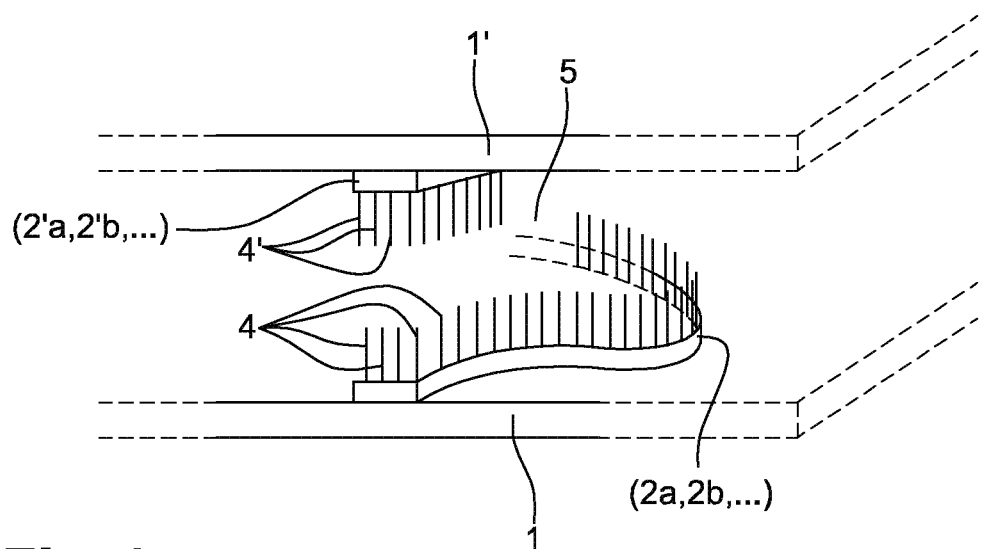
FIG. 4 shows a schematic perspective view of all the components of the electrical energy storage element according to one embodiment of the invention.
Figure 5:
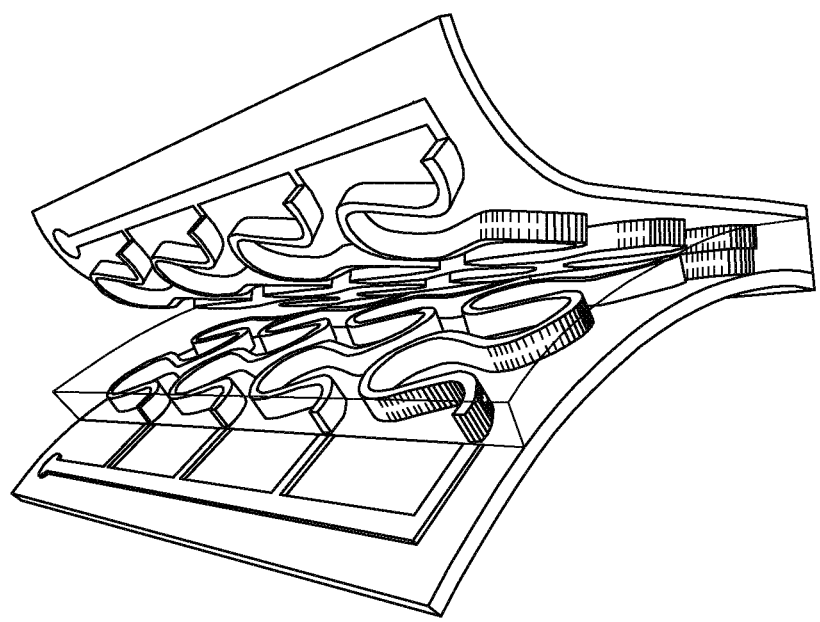
FIG. 5 shows a second schematic perspective and partially exploded view, of all the components of the electrical energy storage element according to one embodiment of the invention.

According to one embodiment of the invention, a first substrate 1 provided with its serpentine anode current collector(s) 2a, 2b, . . . on which an anode 4 is deposited into rows of micro-pillars, is placed facing a second substrate 1' provided with its serpentine electrode current collector(s) 2'a, 2'b, . . . on which a cathode 4' is deposited into rows of micro-pillars. The distance that separates the two faces facing each other must be sufficient so that there is no electrical contact, therefore no short-circuit, between the micro-pillars of the anode and those of the cathode. FIG. 4 schematically illustrates this configuration of the elements constituting the electrical energy storage element. The space 5 separates the two substrates 1 and 1'; the space 5 also separates the anode micro-pillars 4 from each other, and the cathode micro-pillars 4' from each other, and finally separates the anode micro-pillars 4 from the cathode micro-pillars 4'. The space 5 is filled with an electrolyte made of a self-healing polymer type material.

The electrolyte is made of a material selected from a list of self-healing polymer type materials; The self-healing polymer electrolyte will be obtained by combining two others having different functions:
- the self-healing function, thanks to the presence of dangling hydrogen bonds;
- the ionic conductive function;

The self-healing polymers are thus obtained via the functionalization of self-healing monomers with other ionic conductive polymers such as polyethylene oxide (PEO) with different molar masses, polyethylene glycol (PEG), polystyrene (PS) by controlled radical polymerization. Hard blocks such as PS, PMMA or soft blocks such as PABu can be grafted in order to control the hardness and stretchability of the self-healing monomers.

As preferred examples of deformable accumulators according to the present invention, in particular there can be mentioned the deformable accumulators in which the electrolyte is a PEO-b-poly(5-acetylaminopentyl acrylate), or a PEO-b-PS-g-poly(5-acetylaminopentyl acrylate), or a PEG-b-poly(5-acetylaminopentyl acrylate) or a PEG-b-6-(2-ureido-4-pyrimidinone) hexyl acrylate, or else a polymer whose main unit is selected as one of those represented below:

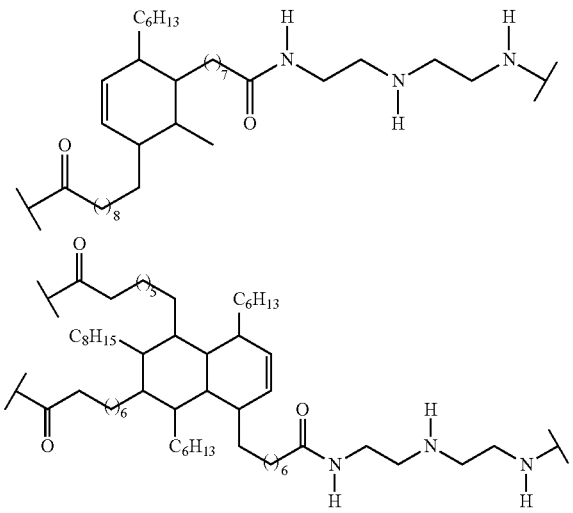

The method for depositing the electrolyte between the two substrates and the electrode micro-pillars is selected from the known methods, and adapted to the considered block copolymer.

In case of stretching of the electrical energy storage element, the structuring of the electrodes into spaced micro-pillars has a first advantage of avoiding the formation of fractures in the material constituting the electrode, or at the interface between the electrode and the current collector.

This structuring has a second advantage; it allows better withstanding the variations in the volume of the electrodes resulting from the successive extractions/insertions of the Li+ ions, and avoiding the losses of contact at the interface between the electrolyte and the electrode, in the case of Lithium-ion batteries.

Furthermore, a third advantage of this structuring into micro-pillars lies in that it increases the contact surface between the electrode and the electrolyte, which further increases the energy and power density available per surface unit.

Finally, a fourth advantage lies in the significant reduction in the electrical resistance called series electrical resistance between the electrodes and the current collectors, ensured by the direct electrical contact therebetween, unlike the long serpentine interconnections of the prior art.

Finally, the use of self-healing polymers will contribute in maintaining an unharmed and continuous interface between the electrodes and the electrolyte after stretchings of the battery.

The invention also concerns a method for manufacturing the deformable storage element. This method comprises the following steps:

a. Preparing a first and a second substrate;

b. Depositing at least one first current collector (2a, 2b, . . . ) on at least a part of a face of the first substrate, close to and along at least one first curved line portion whose length is greater than the distance between its two ends, c. Depositing at least one second current collector (2a', 2b', . . . ) on at least a part of a face of the second substrate, close to and on each side of at least one second curved line whose length is greater than the distance between its two ends, d. Depositing an anode consisting of a first set of pillars (4), on the at least one first current collector (2a, 2b, . . . ), the pillars of the first set being spaced from each other on a surface of the first collector, e. Depositing a cathode consisting of a second set of pillars (4'), on the at least one second current collector (2a', 2b', . . . ), the pillars of the second set being spaced from each other on a surface of the second collector, f. Depositing an electrolyte on the faces of the first and the second substrate on which are deposited respectively the at least one first and the at least one second current collector while immersing the pillars of the anode (4) and the cathode (4') in the electrolyte, then placing these faces facing each other or placing the faces of the first and the second substrate, on which are deposited respectively the at least one first and the at least one second current collector, facing each other, then depositing an electrolyte in the volume (5) delimited by these faces while immersing the pillars of the anode (4) and the cathode (4') in the electrolyte.

The order in which the steps are mentioned is without prejudice to the order in which they must be carried out.

One embodiment of one of the faces of the deformable accumulator according to the method, and more precisely according to the first option of step f of this method, is shown in FIG. 7 through intermediate products formed at different steps.

Thus, there is shown in FIG. 7a the intermediate product which results from the combination of steps a with the placement of a first substrate, followed by a first part b1 of step b, with the deposition of a first current collector and by a first part d1 of step d, with the deposition of the anode or the cathode (4,4'). At this intermediate stage the serpentines of the collector and the micro-pillars of the electrode are not yet formed.

The formation of the micro-pillars of the electrode is then carried out by photolithography; this is the second part d2 of step d, whose result is shown in FIG. 7b.

Then the serpentines 2a, 2b are formed by laser engraving, with the second part b2 of step b, whose intermediate result is shown in FIG. 7c.

Finally, with the last step f, the electrolyte is deposited by a method called «dip-coating», whose intermediate result is schematically shown in FIG. 7d.

The invention claimed is:

1. A deformable accumulator comprising:
    a. first and second deformable planar substrates,
    b. at least one first current collector deposited on at least a part of a face of the first substrate, close to and along at least one first curved line portion whose length is greater than the distance between its two ends, the width of the first current collectors being comprised between 100 µm and 400 µm,
    c. at least one second stretchable current collector deposited on at least a part of a face of the second substrate, close to and on each side of at least one second curved line whose length is greater than the distance between its two ends, the width of the second current collectors being comprised between 100 µm and 400 µm,
    d. an anode consisting of a first set of pillars, deposited on the at least one first current collector, the pillars of the first set being spaced from each other on a surface of the first collector, the pillars of the first set of pillars having a height comprised between 1 µm and 1000 µm, and a width comprised between 1 µm and 100 µm, the pillars of the first set of pillars being spaced one to each other by a distance comprised between 2 µm and 10 µm,
    e. a cathode consisting of a second set of pillars, deposited on the at least one second current collector, the pillars of the second set being spaced from each other on a surface of the second collector, the pillars of the second set of pillars having a height comprised between 1 µm and 1000 µm, and a width comprised between 1 µm and 100 µm, the pillars of the second set of pillars are spaced one to each other by a distance comprised between 2 µm and 10 µm,
    f. an electrolyte allowing the transfer of the ionic species, the electrolyte being a polymer comprising hydrogen bonds, the faces of the first and the second substrate, on which are deposited respectively the at least one first and the at least one second current collector, being placed facing each other and delimiting a volume occupied by the electrolyte in which the pillars of the anode and the cathode are immersed, wherein the height of a first pillar of the first set being less than a first height, the height of the second pillars of the second set which are facing the first pillar being less than a second height, the distance that separates the faces of the first and the second substrate facing each other around the first pillar is greater than the sum of the first height and the second height.

2. The accumulator according to claim 1, wherein the pillars have a height comprised between 10 µm and 100 µm.

3. The accumulator according to claim 2, wherein the pillars have a width comprised between 2 µm and 10 µm.

* * * * *